(12) United States Patent
Lerchner et al.

(10) Patent No.: US 11,354,823 B2
(45) Date of Patent: Jun. 7, 2022

(54) LEARNING VISUAL CONCEPTS USING NEURAL NETWORKS

(71) Applicant: DEEPMIND TECHNOLOGIES LIMITED, London (GB)

(72) Inventors: Alexander Lerchner, London (GB); Irina Higgins, London (GB); Nicolas Sonnerat, London (GB); Arka Tilak Pal, London (GB); Demis Hassabis, London (GB); Loic Matthey-de-l'Endroit, London (GB); Christopher Paul Burgess, London (GB); Matthew Botvinick, Philadelphia, PA (US)

(73) Assignee: DeepMind Technologies Limited, London (GB)

( * ) Notice: Subject to any disclaimer, the term of this patent is extended or adjusted under 35 U.S.C. 154(b) by 156 days.

(21) Appl. No.: 16/617,474

(22) PCT Filed: Jul. 11, 2018

(86) PCT No.: PCT/EP2018/068755
§ 371 (c)(1),
(2) Date: Nov. 26, 2019

(87) PCT Pub. No.: WO2019/011968
PCT Pub. Date: Jan. 17, 2019

(65) Prior Publication Data
US 2020/0234468 A1 Jul. 23, 2020

Related U.S. Application Data

(60) Provisional application No. 62/531,269, filed on Jul. 11, 2017.

(51) Int. Cl.
G06T 9/00 (2006.01)
G06N 3/04 (2006.01)
G06N 3/08 (2006.01)

(52) U.S. Cl.
CPC ........... G06T 9/002 (2013.01); G06N 3/0454 (2013.01); G06N 3/084 (2013.01)

(58) Field of Classification Search
CPC ...... G06T 9/002; G06N 3/0454; G06N 3/084; G06N 3/006; G06N 3/0472; G06K 9/6267
See application file for complete search history.

(56) References Cited

FOREIGN PATENT DOCUMENTS

CN 111818346 A * 10/2020 ............... G06N 3/08

OTHER PUBLICATIONS

Abadi et al., "TensorFlow: Large-Scale Machine Learning on Heterogeneous Distributed Systems," Preliminary White Paper, retrieved from URL <https://storage.googleapis.com/pub-tools-public-publication-data/pdf/45166.pdf>, Nov. 2015, 19 pages.

(Continued)

*Primary Examiner* — Charles T Shedrick
(74) *Attorney, Agent, or Firm* — Fish & Richardson P.C.

(57) ABSTRACT

Methods, systems, and apparatus, including computer programs encoded on computer storage media, for learning visual concepts using neural networks. One of the methods includes receiving a new symbol input comprising one or more symbols from a vocabulary; and generating a new output image that depicts concepts referred to by the new symbol input, comprising: processing the new symbol input using a symbol encoder neural network to generate a new symbol encoder output for the new symbol input; sampling, from the distribution parameterized by the new symbol encoder output, a respective value for each of a plurality of visual factors; and processing a new image decoder input (Continued)

comprising the respective values for the visual factors using an image decoder neural network to generate the new output image.

20 Claims, 7 Drawing Sheets

(56) References Cited

OTHER PUBLICATIONS

Baillargeon, "Infants' Physical World," Current Directions in Psychological Science, 2004, 13(3):89-94.
Baillargeon, "Young Infants' Reasoning about the Physical and Spatial Properties of a Hidden Object," Cognitive Development, Jan. 1987, 2:179-200.
Beattie et al., "DeepMind Lab," https://arxiv.org/abs/1612.03801v2, Dec. 2016, 11 pages.
Bengio et al., "Representation Learning: A Review and New Perspectives," IEEE Transactions on Pattern Analysis and Machine Intelligence, Aug. 2013, 35(8): 1798-1828.
Burgess et al., "Understanding disentangling in β-VAE," https://arxiv.org/abs/1804.03599, Apr. 2018, 11 pages.
Garnelo et al., "Towards Deep Symbolic Reinforcement Learning," https://arxiv.org/abs/1609.05518v2, last revised Oct. 2016, 13 pages.
GitHub.com [online], "dSprites—Disentanglement testing Sprites dataset," Jun. 2017, retrieved on Feb. 25, 2020, retrieved from URL <https://github.com/deepmind/dsprites-dataset/>, 3 pages.
Gregor et al., "DRAW: A Recurrent Neural Network For Image Generation," Proceedings of the 32nd International Conference on Machine Learning, retrieved from URL <http://jmlr.org/proceedings/papers/v37/gregor15.pdf>, Jun. 2015, 10 pages.
He et al., "Deep Residual Learning for Image Recognition," 2016 IEEE Conference on Computer Vision and Pattern Recognition (CVPR), Jun. 2016, 770-778.
Higgins et al., "Early Visual Concept Learning with Unsupervised Deep Learning," https://arxiv.org/abs/1606.05579v1, Jun. 2016, 12 pages.
Higgins et al., "beta-VAE: Learning Basic Visual Concepts with a Constrained Variational Framework," retrieved from URL <https://pdfs.semanticscholar.org/a902/26c41b79f8b06007609f39f82757073641e2.pdf>, Apr. 2017, 13 pages.
Higgins et al., "DARLA: Improving Zero-Shot Transfer in Reinforcement Learning," Proceedings of the 34th International Conference on Machine Learning, Aug. 2017, 11 pages.
Higgins et al., "SCAN: Learning Abstract Hierarchical Compositional Visual Concepts," https://arxiv.org/abs/1707.03389v1, Jul. 2017, 22 pages.
Higgins et al., "SCAN: Learning Hierarchical Compositional Visual Concepts," Open Review Feb. 15, 2018, retrieved from URL <https://openreview.net/forum?id=rkN2Il-RZ>, 24 pages.
Jaderberg et al., "Reinforcement Learning with Unsupervised Auxiliary Tasks," https://arxiv.org/abs/1611.05397, Nov. 2016, 14 pages.
Kingma et al., "Adam: A Method for Stochastic Optimization," https://arxiv.org/abs/1412.6980v1, Dec. 2014, 9 pages.
Kingma et al., "Auto-Encoding Variational Bayes," https://arxiv.org/abs/1312.6114v10, last revised May 2014, 14 pages.
Kingma et al., "Semi-Supervised Learning with Deep Generative Models," https://arxiv.org/abs/1406.5298v2, last revised Oct. 2014, 9 pages.
Lake et al., "Building Machines That Learn and Think Like People," https://arxiv.org/abs/1604.00289v3, last revised Nov. 2016, 58 pages.
Lake et al., "Human-level concept learning through probabilistic program induction," Science, retrieved from URL <https://ai6034.mit.edu/wiki/images/LakeDec2015.pdf>, Dec. 2015, 350(6266):1332-1338.
Liu et al., "Deep Learning Face Attributes in the Wild," 2015 IEEE International Conference on Computer Vision (ICCV), Dec. 2015, 3730-3738.
Mikolov et al., "Distributed Representations of Words and Phrases and their Compositionality," https://arxiv.org/abs/1310.4546, Oct. 2013, 9 pages.
Mnih et al., "Asynchronous Methods for Deep Reinforcement Learning," https://arxiv.org/abs/1602.01783v2, last revised Jun. 2016, 19 pages.
Mnih et al., "Human-level control through deep reinforcement learning," Nature, Feb. 2015, 518:529-533.
Pandey et al., "Variational methods for conditional multimodal deep learning," 2017 International Joint Conference on Neural Networks (IJCNN), May 2017, 308-315.
Pathak et al., "Context Encoders: Feature Learning by Inpainting," https://arxiv.org/abs/1604.07379v2, last revised Nov. 2016, 12 pages.
PCT International Preliminary Report on Patentability in International Appln. No. PCT/EP2018/068755, dated Jan. 23, 2020, 8 pages.
PCT International Search Report and Written Opinion in International Appln. No. PCT/EP2018/068755, dated Oct. 11, 2018, 14 pages.
Perarnau et al., "Invertible Conditional GANs for image editing," https://arxiv.org/abs/1611.06355, Nov. 2016, 9 pages.
Pu et al., "Variational Autoencoder for Deep Learning of Images, Labels and Captions," Proceedings of the 30th International Conference on Neural Information Processing Systems, Dec. 2016, 9 pages.
Reed et al., "Generative Adversarial Text to Image Synthesis," https://arxiv.org/abs/1605.05396v2, last revised Jun. 2016, 10 pages.
Reed et al., "Learning Deep Representations of Fine-Grained Visual Descriptions," 2016 IEEE Conference on Computer Vision and Pattern Recognition (CVPR), Jun. 2016, 49-58.
Rezende et al., "Stochastic Backpropagation and Approximate Inference in Deep Generative Models," https://arxiv.org/abs/1401.4082v3, last revised May 2014, 14 pages.
Rosch, "Principles of Categorization," Cognition and Categorization, retrieved from URL <http://tamaraberg.com/teaching/Fall_13/papers/Cognition&Categorization.pdf>, 1978, 24 pages.
Silver et al., "Mastering the game of Go with deep neural networks and tree search," Nature, Jan. 2016, 529:484-489.
Smith et al., "Sources of Uncertainty in Intuitive Physics," Topics in Cognitive Science, 2013, (5):185-199.
Sohn et al., "Learning Structured Output Representation using Deep Conditional Generative Models," Proceedings of the 28th International Conference on Neural Information Processing Systems, retrieved from URL <https://pdfs.semanticscholar.org/3f25/e17eb717e5894e0404ea634451332f85d287.pdf>, Dec. 2015, 9 pages.
Spelke, "Principles of Object Perception," Cognitive Science, Jan. 1990, (14):29-56.
Srivastava et al., "Multimodal Learning with Deep Boltzmann Machines," Journal of Machine Learning Research, Sep. 2014, 15:2949-2980.
Suzuki et al., "Joint Multimodal Learning with Deep Generative Models," https://arxiv.org/abs/1611.01891, Nov. 2016, 12 pages.
Szegedy et al., "Going Deeper with Convolutions," https://arxiv.org/abs/1409.4842, Sep. 2014, 12 pages.
Tennenbaum, "Bayesian modeling of human concept learning," NIPS, retrieved from URL <http://axon.cs.byu.edu/~martinez/classes/778/Papers/BayesianCL.pdf>, 1999, 7 pages.
Van den Oord et al., "Conditional image generation with PixelCNN decoders," Proceedings of the 30th International Conference on Neural Information Processing Systems, Dec. 2016, 9 pages.
Van den Oord et al., "WaveNet: A Generative Model for Raw Audio," https://arxiv.org/abs/1609.03499v2, Sep. 2016, 15 pages.
Vedantam et al., "Generative Models of Visually Grounded Imagination," https://arxiv.org/abs/1705.10762v1, May 2017, 25 pages.
Vincent et al., "Stacked Denoising Autoencoders: Learning Useful Representations in a Deep Network with a Local Denoising Criterion," Journal of Machine Learning Research, retrieved from URL <http://www.jmlr.org/papers/v11/vincent10a.html>, Dec. 2010, 3371-3408.
Wang et al., "Deep Variational Canonical Correlation Analysis," https://arxiv.org/abs/1610.03454v1, Oct. 2016, 15 pages.

(56) References Cited

OTHER PUBLICATIONS wikipedia.org [online], "HSL and HSV," Jun. 15, 2017, retrieved on Feb. 25, 2020, retrieved from URL <https://en.wikipedia.org/w/index.php?title=HSL_and_HSV&oldid=785783556>, 17 pages.

Yan et al., "Attribute2Image: Conditional Image Generation from Visual Attributes," European Conference on Computer Vision, Sep. 2016, 776-791.

* cited by examiner

LEARNING VISUAL CONCEPTS USING NEURAL NETWORKS

CROSS-REFERENCE TO RELATED APPLICATION

This application is a non-provisional of and claims priority to U.S. Provisional Patent Application No. 62/531,269, filed on Jul. 11, 2017, the entire contents of which are hereby incorporated by reference.

BACKGROUND

This specification relates to generating images and symbolic outputs, e.g., collections of one or more words, using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Variational autoencoders are neural networks that can autoencode input data items, i.e., generate output data items that are reconstructions of input data items provided to the autoencoder. Variational autoencoders typically include an encoder neural network and a decoder neural network. Generally, the encoder neural network and the decoder neural network in a given variational autoencoder are trained jointly to generate reconstructions of input data items.

SUMMARY

This specification describes a system implemented as one or more computer programs on one or more computers in one or more locations that generates images that depict concepts referred to by received symbol inputs, i.e., inputs that may include one or more natural language words. The system also generates symbol outputs that include symbols that refer to concepts depicted in received input images.

In one aspect the system may implement an image encoder neural network having a plurality of image encoder parameters. The image encoder neural network may be configured to receive an input image, and process the input image in accordance with the image encoder parameters to generate an image encoder output that parameterizes a distribution over possible values for each of a plurality of generative visual factors of variation. The system may also implement an image decoder neural network having a plurality of image decoder parameters. The image decoder neural network may be configured to receive an image decoder input comprising a respective value for each of the plurality of visual factors, and process the image decoder input in accordance with the image decoder parameters to generate an output image defined by the values for the visual factors in the image decoder input.

The system may also implement a symbol encoder neural network having a plurality of symbol encoder parameters. The symbol encoder neural network may be configured to receive a symbol input comprising one or more symbols from a vocabulary of symbols, and process the symbol input in accordance with the symbol encoder parameters to generate a symbol encoder output that parameterizes a distribution over possible values for each of the plurality of generative visual factors of variation. The system may also implement a symbol decoder neural network having a plurality of symbol decoder parameters. The symbol decoder neural network may be configured to receive a symbol decoder input comprising a respective value for each of the plurality of generative visual factors, and process the symbol decoder input in accordance with the symbol decoder parameters to generate a symbol output that includes one or more symbols from the vocabulary of symbols The system may also implement a subsystem configured to receive a new symbol input comprising one or more symbols from the vocabulary, and generate a new output image, in particular that depicts concepts referred to by the new symbol input. In some implementations the subsystem generating the new output image may comprise processing the new symbol input using the symbol encoder neural network to generate a new symbol encoder output for the new symbol input; sampling, from the distribution parameterized by the new symbol encoder output, a respective value for each of the plurality of visual factors; and processing a new image decoder input comprising the respective values for the visual factors using the image decoder neural network to generate the new output image.

In broad terms, the generative visual factors of variation may comprise visual primitives usable to generate the output image; they may be represented in a latent variable space of the image encoder. More particularly, the generative visual factors of variation may each be represented by a parameterized distribution, for example the mean and covariance of a Gaussian—that is the image encoder output and symbol encoder output may comprise parameters of such distributions. The image encoder may generate disentangled representations of the visual factors. Here a disentangled representation is one in which the factors are generally independent of one another (so that varying one factor does not significantly affect another) and in which the factors may be interpretable in the sense that a small total number of factors can classify the visual variation in an image.

In implementations the latent variable space of the image encoder may be the same as or correspond to the latent variable space of the symbol encoder. The concepts referred to by the new symbol input may be concepts defined in terms of distributions over the generative visual factors of variation, for example the grounded visual primitives.

In some implementations the subsystem may be further configured to receive a new input image, and generate a new symbol output that includes one or more symbols, in particular that refer to concepts (defined in terms of distributions over the generative visual factors of variation) depicted in the new input image. This may comprise processing the new input image using the image encoder neural network to generate a new image encoder output for the new input image; sampling, from the distribution parameterized by the new image encoder output, a respective value for each of the plurality of visual factors; and processing a new symbol decoder input comprising the respective values for the visual factors using the symbol decoder neural network to generate the new symbol output.

The system may also implement a symbol recombination unit or symbol recombination neural network having a plurality of recombination parameters. The symbol recombination unit or neural network may be configured to receive a recombination input comprising (i) a first symbol encoder output generated from a first symbol input, (ii) a second symbol encoder output generated from a second symbol input, and (iii) data identifying a recombination operator to be applied to the first symbol input and the second symbol input. The recombination input may be processed, for example in accordance with the recombination parameters, to generate a recombined output that parametrizes a recombined distribution over possible values for each of the plurality of generative visual factors of variation.

The first and second symbol encoder outputs may each comprise a parameterized distribution (i.e. set of parameters defining a distribution) for each of the visual factors of variation. The recombination operator may be applied to combine these to provide parameters defining the recombined distribution, for example to implement logical operations. In some implementations the recombination operator may implement a closed-form operation, for example by determining a weighted sum and/or mean of the parameters. In some other implementations the processing is performed using a symbol recombination neural network, the parameters of which may be learned to implement the operations. Example operations are described later.

The previously described subsystem may be further configured to process the first symbol input using the symbol encoder neural network to generate the first symbol encoder output; process the second symbol input using the symbol encoder neural network to generate the second symbol encoder output; process the recombined input using the symbol recombination neural network to generate the recombined output; and generate a first output image. The first output image may depict concepts (defined in terms of distributions over the generative visual factors of variation) referred to by a recombined symbol resulting from applying the recombination operator to the first symbol input and the second symbol input. The subsystem may thus sample, from the recombined distribution parameterized by the recombined output, a respective value for each of the plurality of visual factors, and process a first image decoder input comprising the respective values for the visual factors using the image decoder neural network to generate the first output image.

The recombination neural network may include at least one layer that applies a recombination (operator) dependent transformation to an activation of the layer, for example a recombination (operator) dependent bias. Additionally or alternatively the recombination neural network may comprise a conditional convolutional (neural network) module that is conditioned on the operator. For example the recombination operator may be defined by a one-hot vector and the convolutional module may be conditioned on the operator using a tensor product operation of parameters of the convolutional (neural network) module with the one-hot vector to select the operation.

The symbol encoder neural network and the symbol decoder neural networks may comprise feedforward neural networks and/or recurrent neural networks. Use of a recurrent neural network may facilitate encoding/manipulating/generating concepts represented by a series of images and/or symbols.

In another aspect a method of training a symbol encoder neural network and symbol decoder neural network as described above determines trained values of the symbol encoder parameters and the symbol decoder parameters by receiving a training symbol input and a training image that matches the training symbol input, processing the training image using the image encoder neural network in accordance with first values of the image encoder parameters to generate a training image encoder output for the training image, and processing the training symbol input using the symbol encoder neural network in accordance with current values of the symbol encoder parameters to determine a training symbol encoder output for the training symbol input. The method may further comprise sampling, from the distribution parameterized by the training symbol encoder output, a respective value for each of the plurality of visual factors, and processing a training symbol decoder input comprising the respective values for the visual factors using the symbol decoder neural network in accordance with current values of the symbol decoder parameters to generate a training symbol output. The method may further comprise determining a gradient with respect to the symbol encoder parameters and the symbol decoder parameters of an objective function. The objective function may include (i) a variational auto encoder (VAE) objective and/or (ii) a term that encourages alignment between the training symbol encoder output and the training image encoder output. The method may further comprise determining an update to the current values of the symbol encoder parameters and the symbol decoder parameters using the gradient.

In some implementations the variational auto encoder (VAE) objective comprises at least a first term which aims to match the training symbol input and output and may include a second term, weighted by a parameter ($\beta$) which weights more disentangled representations, for example an additional (negative) loss dependent on the capacity of the latent channel between the symbol encoder and decoder multiplied by $\beta$. In some implementations the term that encourages alignment between the training symbol encoder output and the training image encoder output may comprise a measure of a difference, for each of the visual factors, between a distribution parameterized by the training symbol input and a distribution parameterized by the training image, for example a KL divergence, in particular a forward KL divergence (where the distribution parameterized by the training image is the true distribution).

As previously described, the image encoder neural network may be trained (before training the symbol encoder neural network) to generate disentangled representations of the factors to determine the first values of the image encoder parameters. The image encoder neural network and the image decoder neural network may be trained jointly using a $\beta$-VAE training technique, for example to match a decoded image output from the image decoder neural network to the training image. This may comprise training using an objective with a first term (such as a pixel level log-likelihood) which aims to match the training image input and output and may include a second term, weighted by a parameter ($\beta$) which weights more disentangled representations, for example an additional (negative) loss dependent on the capacity of the latent channel between the image encoder and decoder multiplied by $\beta$. Alternatively the $\beta$-VAE training technique may be modified to replace the first term with a loss in a high-level feature space of a denoising autoencoder. Thus in such an approach the first term may comprise a difference (L2 loss) between a feature-space encoding of the training image and a feature-space encoding of the decoded image output. The feature-space encoding may be provided, for example, by a trained de-noising autoencoder.

There is also described a method of training the symbol recombination neural network described above to determine trained values of the recombination parameters. The method may comprise obtaining a training first symbol input, a training second symbol input, data identifying a recombination operator, and a training image that depicts concepts referred to by a recombination of the training first symbol input and the training second symbol input using the recombination operator. The method may further comprise processing the training first symbol input using the symbol encoder neural network to generate a training first symbol encoder output, and processing the training second symbol input using the symbol encoder neural network to generate a training second symbol encoder output. The method may further comprise processing a training recombined input comprising the training first symbol encoder output, the training second symbol encoder output, and data identifying the recombination operator using the symbol recombination neural network in accordance with current values of the recombination parameters to generate a training recombined output. The method may further comprise processing the training image using the image encoder neural network to generate a training image encoder output. The method may further comprise determining a gradient of an objective function that depends on a divergence between the training image encoder output and the training recombined output, and determining an update to the current values of the recombination parameters using the gradient.

The symbol recombination neural network may comprise a convolutional neural network; it may be trained to implement logical operations such as AND, IGNORE and IN COMMON as described later.

Particular embodiments of the subject matter described in this specification can be implemented so as to realize one or more of the following advantages. The systems described in this specification can effectively perform multi-modal inference, i.e., can effectively generate both images from symbols and symbols from images. Additionally, the systems described in this specification can generate symbols, images, or both more accurately than conventional approaches and can generate more diverse symbols, images, or both than conventional approaches while being trained in a significantly more sample-efficient way than the conventional approaches. That is, the described systems can achieve performance that exceeds that of conventional systems while being trained using much less labeled training data, using many fewer image—symbol training pairs. Accordingly, the described systems achieve improved performance while requiring less data and therefore fewer computing resources to train. By mapping symbol inputs to visual factors of variation, the system can effectively handle synonyms, i.e., symbol inputs that refer to the same concepts but use different words. By augmenting the system with a recombination neural network, the system can use recombination operators to traverse a concept hierarchy and manipulate learnt concepts to represent new concepts that were not present by themselves in images or symbols used to train the system.

Thus in some implementations the described systems can extract meaningful, that is interpretable concepts from training data, where a training data item typically includes more than one concept, and can manipulate the concepts to obtain further concepts which are either more general or more specific—the concept of a particular color for example. These are grounded in visual/symbolic examples and may thus be used to generate or "imagine" examples including the concept and/or the concepts may be communicated directly using their grounded internal representation. The ability to represent an image in terms of one or more concepts can enable substantial memory savings when processing and/or manipulating images—for example it is much more efficient to store and process the grounded concept of an "apple" than many example images of apples. In a similar manner the ability to represent an image as one or more concepts can substantially reduce communications bandwidth—for example to communicate the concept "apple". In implementations the ability to recombine concepts, for example using operations which are analogous to logical operations, similarly reduces memory and communication bandwidth requirements because a smaller number of learned concepts can be used to represent a larger total number of concepts.

Some applications are described later but in broad terms some implementations the described system may be used as a generative model for image classification, reinforcement learning, control tasks, and/or planning tasks. For example the image or symbol input may be used to define an instruction or series of instructions for an electronic or electro-mechanical control task, in terms of the concepts represented. The output of such a system may comprise the image or symbol output or an internal representation of one or more concepts such as the later described latent visual factor values. In another application the symbol output or internal representation may be used to provide a compressed representation of one or more input images, for example for storage and/or communication.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
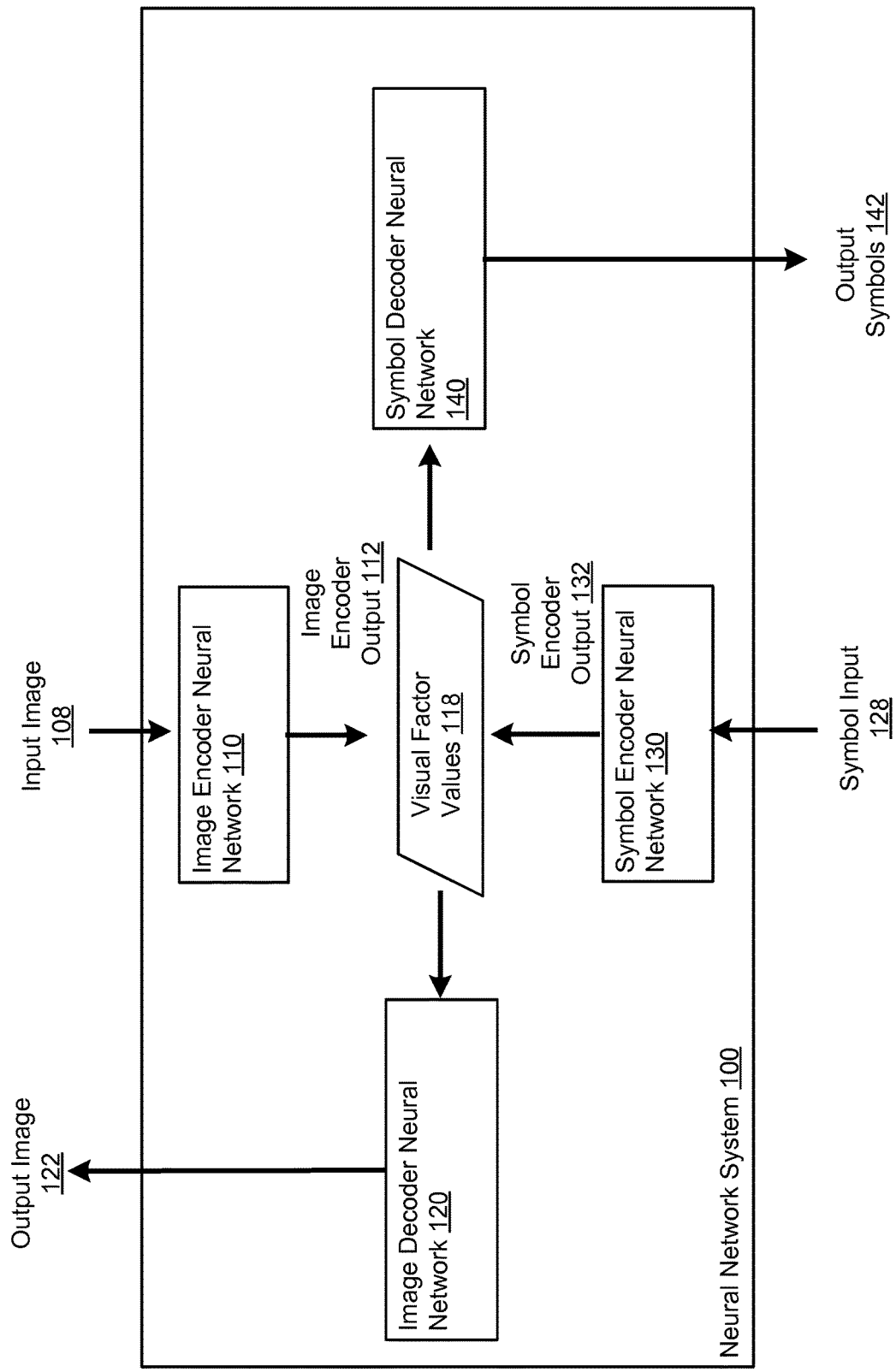
FIG. 1A shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 is a system that can operate both on input images, e.g., input image 108, and on input symbols, e.g., symbol input 128.

Generally, any given symbol input includes one or more symbols, e.g., words in a particular natural language, from a vocabulary of symbols. More specifically, each symbol input includes one or more words identifying attributes that describe a scene that may be depicted in an image. In other words, each symbol input refers to one or more concepts that may be depicted in the image.

When the input to the neural network system 100 is the input image 108, the neural network system 100 converts the input image 108 into a symbol output 142 that includes one or more symbols that refer to the concepts depicted in the input image 108. In other words, the words in the symbol output identify attributes of the scene depicted in the input image 108. As an example, when the input image 108 is an image of a red suitcase, the symbol output 142 can include the symbols "red" and "suitcase."

When the input to the neural network system 100 is the symbol input 128, the neural network system 100 converts the symbol input 128 into an output image 122 that depicts one or more concepts referred to by the symbols in the symbol input 128. As an example, when the symbol input 128 includes the symbols "red" and "suitcase," the output image 122 can depict a scene that includes a red suitcase.

Because of how the system 100 is configured, and in implementations assisted by how the components of the system 100 are trained, the system 100 can effectively operate on symbol inputs that refer to concepts that are at varying levels of a concept hierarchy that ranges from relatively specific to relatively more general.

For example, the system 100 can receive one symbol input that specifies all of: an object identity of an object in the scene ("suitcase"), object colour ("red"), floor colour ("brown") and wall colour ("white") and generate an output image of a scene that has all of the attributes identified in the symbol input, i.e., an image of a red suitcase in a room with brown floors and white walls.

The system 100 can then receive another symbol input that specifies only the object in the scene ("suitcase") and generate an output image that depicts a scene that includes the specified object and has plausible attributes for the attributes not identified in the image input, i.e., an image of a suitcase that has a plausible color in a room that has plausible characteristics.

To operate on symbols, the system 100 encodes the symbols as numeric values using an appropriate technique. For example, the system can encode a symbol input 128 having k symbols as a k-hot vector. As another example, the system can encode the symbol input 128 as k embedding vectors, one for each symbol in the input. As yet another example, the system can encode the symbol input 128 as a single vector that is the sum or the average of the k embedding vectors. When generating symbol outputs, the system 100 can convert the numeric representations to the actual symbols using the same technique used to encode the symbols.

The neural network system 100 includes an image encoder neural network 110, an image decoder neural network 120, a symbol encoder neural network 130, and a symbol decoder neural network 140.

The image encoder neural network 110 is a neural network having parameters (referred to in this specification as "image encoder parameters") and configured to receive the input image 108 and to process the input image 108 in accordance with the image encoder parameters to generate an image encoder output 112.

The image encoder output 112 parameterizes a distribution over possible values for each of a plurality of generative visual factors of variation. That is, the image encoder output 112 defines, for each of a fixed number of generative visual factors, a probability distribution over possible values for the generative visual factor. For example, the image encoder output 112 can parameterize a multivariate Gaussian distribution over the generative visual factors of variation by including means and covariances of the multivariate distribution.

A generative visual factor of variation is a factor that changes when a particular aspect of the appearance of an input image changes (or, as described below, a change in the visual factor will cause a corresponding change to a particular aspect of an output image that is reconstruction of the input image and is generated based on the visual factors). That is, when the value of a given generative visual factor changes, the particular aspect corresponding to the given visual factor of an image generated based on the visual factor also changes.

In particular, the image encoder neural network 110 has been trained to generate disentangled representations of the generative visual factors, though such a representation is not essential for the system to operate. A disentangled representation is one that is factorized and interpretable. That is, each probability distribution in the image encoder output 112 is sensitive to changes in a single generative factor, i.e., is different when a particular aspect of the input image 108 is modified, while being relatively invariant to changes in other factors, i.e., is relatively the same when other aspects of the input image 108 are modified. In other words, when only a single visual factor is modified, the corresponding aspect of the image is modified while other aspects remain relatively the same. Where color images are employed the images may be provided in, or converted to, HSV color space rather than RGB color space.

Training the image encoder neural network 110 is described in more detail below with reference to FIG. 5.

The image encoder neural network 110 can have any architecture that is appropriate for converting input images to distribution parameters. For example, the image encoder neural network 110 can be a feedforward convolutional neural network that generates the distribution parameters in a single time step. As another example, the image encoder neural network 110 can be a recurrent convolutional neural network that generates the distribution parameters over multiple time steps.

The image decoder neural network 120 is a neural network having parameters (referred to in this specification as "image decoder parameters") and configured to receive a set of latent visual factor values 118 that includes one or more respective values for each of the generative visual factors and to process the latent visual factor values 118 in accordance with the image decoder parameters to generate an output image 122.

The image decoder neural network 120 has been trained, e.g., jointly with the image encoder neural network 110, to generate images that accurately reflect the latent visual factor values 118. That is, the image decoder neural network 120 has been trained to generate accurate reconstructions of input images using only the latent visual factor values 118. Thus, modifying a given latent visual factor value in the set of values 118 will result in a change in the particular aspect of the output image that corresponds to the given latent visual factor.

Training the image decoder neural network 120 is described in more detail below with reference to FIG. 5.

The image decoder neural network 120 can have any architecture that is appropriate for converting a set of numeric values to an image. For example, the image decoder neural network 120 can be a feedforward convolutional neural network that generates the image in a single time step. As another example, the image decoder neural network 120 can be a recurrent convolutional neural network that generates the image over multiple time steps.

The symbol encoder neural network 130 is a neural network having parameters (referred to in this specification as "symbol encoder parameters") and configured to receive the symbol input 128 and to process the symbol input 128 in accordance with the symbol encoder parameters to generate a symbol encoder output 132 that, like the image encoder output 112, parameterizes a distribution over possible values for each of the plurality of generative visual factors of variation. That is, the symbol encoder output 132 and the image encoder output 112 both parametrize distributions over the same number of generative visual factors. The symbol encoder output can also include means and covariance of a multivariate Gaussian distribution.

The symbol encoder neural network 130 can have any architecture that is appropriate for converting numeric representations of symbols to distribution parameters. For example, the symbol encoder neural network 130 can be a feedforward multi-layer perceptron (MLP) neural network that generates the distribution parameters in a single time step. As another example, the symbol encoder neural network 130 can be a recurrent neural network that generates the distribution parameters over multiple time steps.

The symbol decoder neural network 140 is a neural network having parameters (referred to in this specification as "symbol decoder parameters") and configured to receive the visual factor values 118 and to process the visual factor values 118 in accordance with the symbol decoder parameters to generate the symbol output 142. That is, both the symbol decoder neural network 140 and the image decoder neural network 120 are configured to operate on inputs that have the same dimensionality.

The symbol decoder neural network 140 has been trained jointly with the symbol encoder neural network 130 to generate symbol outputs that refer to concepts that describe the visual factor values that are input to the symbol decoder neural network 140.

Training the symbol decoder neural network 140 is described below with reference to FIG. 5.

The symbol decoder neural network 140 can have any architecture that is appropriate for converting visual factor values to numeric representations of symbols. For example, the symbol decoder neural network 140 can be a feedforward multi-layer perceptron (MLP) neural network that generates the symbols in a single time step. As another example, the symbol decoder neural network 140 can be a recurrent neural network, e.g., a sequence to sequence neural network, that generates the symbols over multiple time steps.

To generate the symbol output 142 from the input image 108, the system 100 processes the input image 108 using the image encoder neural network 110 to generate the image encoder output 112.

The system 100 then samples from the distribution defined by the image encoder output 112 to generate the visual factor values 118, i.e., samples a respective value for each of the generative visual factors, and processes the visual factor values 118 using the symbol decoder neural network 140 to generate the symbol output 142.

To generate the output image 122 from the symbol input 128, the system 100 processes the symbol input 128 using the symbol encoder neural network 130 to generate the symbol encoder output 132. The system 100 then samples from the distribution defined by the symbol encoder output 112 to generate the visual factor values 118 and processes the visual factor values 118 using the image decoder neural network 120 to generate the output image 122.

Thus, once trained, the system 100 is able to effectively perform multi-modal inference, i.e., to both generate accurate images from symbol inputs and to generate accurate symbol outputs from input images. In particular, the system 100 is able to map concepts referred to by symbol inputs to the appropriate values of latent visual factors that will cause an image to be generated that accurately depicts the concepts. The system 100 is also able to map images to the appropriate values of latent visual factors that will cause symbols to be generated that refer to those concepts that are depicted in the images. Because the system 100 maps symbols to visual factors, the system 100 can effectively handle multiple referents to the same concept, i.e. synonyms that refer to the same concept using different symbols.

In some implementations, the neural network system 100 also includes, i.e., is augmented with, a symbol recombination neural network.

When the neural network system 100 is augmented with a symbol recombination neural network, the system 100 can receive multiple symbol inputs and data specifying how to combine the symbol inputs, i.e., data specifying a recombination operation to be applied to the symbol inputs, and then generate an output image that depicts concepts referred to by the combined symbol inputs.

In some implementations, the system 100 provides the outputs of the system, i.e., the output images or the output symbols generated by the system 100, for presentation to users on user devices. For example, the system 100 can receive an input from a user of a user device, e.g., a symbol input or an input image, and generate an appropriate output, e.g., an image or a symbol output, and provide the output for presentation to the user of the user device.

In some other implementations, the system 100 provides the output of the system and/or the intermediate representations generated by the system, i.e., the latent visual factor values or the encoder outputs, to another system for later use.

For example, the system 100 can receive an input image and provide one or more of the image encoder output, the latent visual factor values, or the symbol output generated for the input image to an image classification system for use in classifying the input image.

As another example, the system 100 can receive an input image of an environment being interacted with by an agent, i.e., a robot or other mechanical agent, and provide one or more of the image encoder output, the latent visual factor values, or the symbol output generated for the input image to a control system for use in controlling the agent or in planning actions to be performed by the agent. For example, the other system can be a system that uses reinforcement learning to control the agent or plan actions to be performed by the agent.

As yet another example, the system 100 can receive a symbol input that specifies instructions for an agent, i.e., a robot or other mechanical agent, and provide one or more of the symbol encoder output, the latent visual factor values, or the image output generated for the symbol input to a control system for use in controlling the agent or in planning actions to be performed by the agent. For example, the other system can be a system that uses reinforcement learning to control the agent or plan actions to be performed by the agent and the symbol input can characterize the task that the agent should perform while interacting with the environment.

Figure 1B:
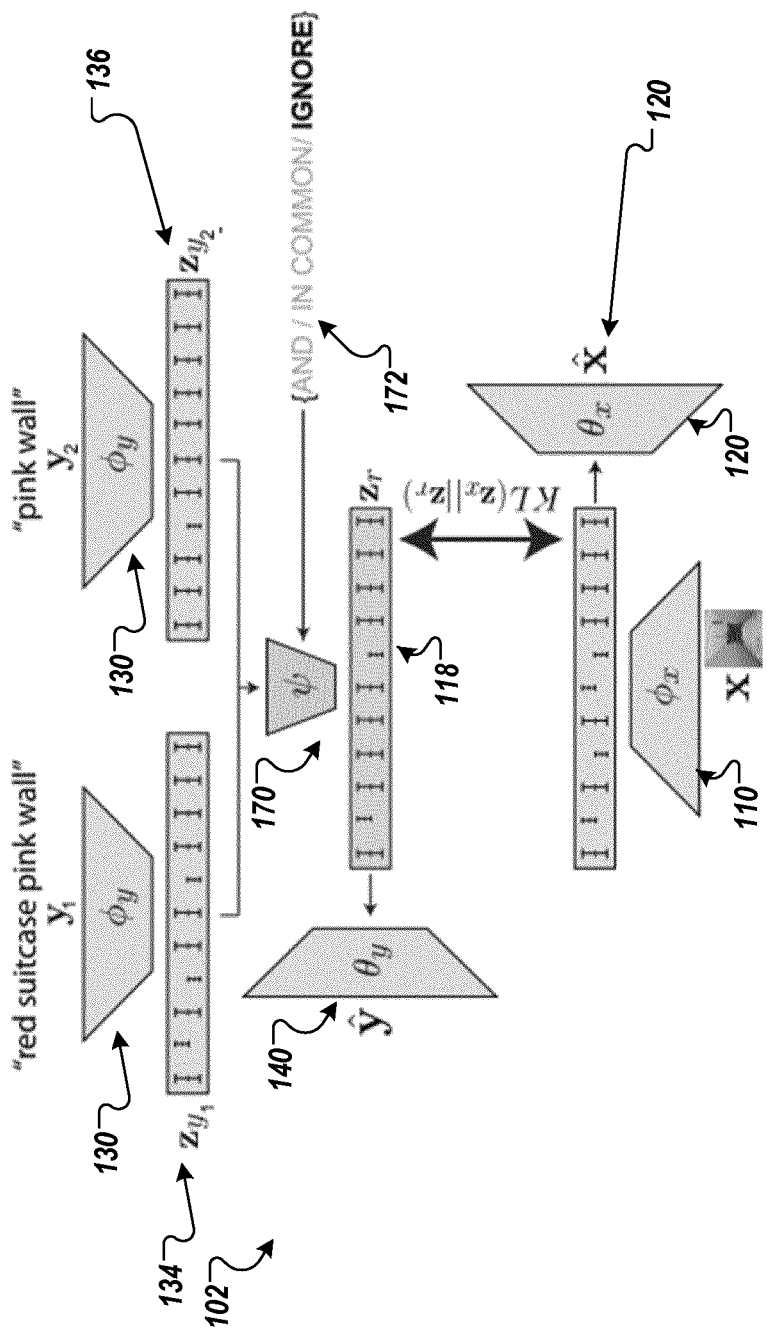
FIG. 1B shows an example symbol recombination neural network.

FIG. 1B shows an example symbol recombination neural network 170.

In the example of FIG. 1B, the system 100 is configured to perform any of three different recombination operations on received symbol inputs: AND, which identifies the conjunction of two orthogonal concepts, IN COMMON, which identifies the overlap between two non-orthogonal concepts, and IGNORE, which identifies the difference between two non-orthogonal concepts.

In particular, the recombination neural network 170 is a neural network having parameters (referred to in this specification as "recombination parameters") and configured to receive a first symbol encoder output 134 generated by the symbol encoder neural network 130 for a first symbol input ("red suitcase pink wall") and a second symbol encoder output 134 generated by the symbol encoder neural network 130 for a second symbol input ("pink wall").

The recombination neural network 170 is also configured to receive data 172 identifying a recombination operator, i.e., one of AND, IN COMMON, or IGNORE, to be applied to the first symbol input and the second symbol input. In the example of FIG. 1B, the data 172 specifies that the IGNORE operator is to be applied. The data 172 can specify the operator in any of a variety of ways, e.g., as a one-hot vector identifying the specified operator or as an embedding vector for the specified operator.

The recombination neural network 170 is configured to process the recombination input in accordance with the recombination parameters to generate a recombined output that parametrizes a recombined distribution over possible values for each of the plurality of generative visual factors of variation. That is, the recombined output parametrizes distributions over the same number of generative visual factors as the symbol encoder output 132 and the image encoder output 112 and can then be used to generate the visual factor values 118.

The system 100 can process the visual factor values 118 using the image encoder neural network 120 to generate the output image 122.

In particular, the recombination neural network 170 has been trained to generate recombined outputs that result in output images being generated that depict concepts referred to the specified recombination of the first symbol input and the second symbol input.

More specifically, the recombination neural network 170 is trained on training data that includes pairs of symbol inputs and, for each symbol input, an image that depicts concepts referred to by the first symbol input and the second symbol input after the specified recombination operation has been applied. Thus, although the recombination neural network 170 is not provided data that explicitly defines the effect of the recombination operation, the recombination neural network 170 is nonetheless able to generate recombined outputs that result in output images that reflect the specified recombination operation being applied to the symbol inputs.

In the example of FIG. 1B, because of the training, the output image 122 depicts a scene that includes a red suitcase and may or may not include a pink wall, i.e., because the "pink wall" symbols were disregarded due to the IGNORE operator.

While in the example of FIG. 1B, how to recombine the two symbol inputs is immediately apparent because there is overlap in the exact words of the two symbol inputs, the recombination neural network 170 can also accurately perform more subtle recombinations. For example, an image depicting an object that is blue and small (but that can otherwise have any plausible attribute) can be generated any of the following ways: "blue" AND "small" (with the recombination going down the hierarchy from more general to more specific), "blueberry" IN COMMON "bluebell" (with the recombination going up the hierarchy from more specific to more general) or "blueberry" IGNORE "round" (also going up the hierarchy). Thus recombination neural network 170 may be instructed to combine learned concepts to generate new concepts and optionally corresponding images. Optionally a second system, previously trained on the learned concepts, may be trained to associate a new symbol with such a new concept.

The recombination neural network 170 can generate the recombined output in a manner that is different for different recombination operators in any of a variety of ways.

For example, the recombination neural network 170 can be a feedforward neural network, e.g., an MLP, that operates on the first and second symbol encoder outputs. The recombination neural network 170 may then include at least one layer that applies a recombination dependent transformation to an activation function of the layer. For example, one or more of the layers can apply a bias that is different for different recombination operators.

As another example, the recombination neural network 170 can be a conditional convolutional module that is conditioned on the recombination operator. For example, the convolutional module can be conditioned on the operator using a tensor product operation.

In more detail, the convolutional module can stride over the parameters of each matching component of the two symbol encoder outputs one at a time and output the corresponding parametrised component of the recombined distribution. The conditioning can be implemented as a tensor product, i.e., between a parameter tensor of the convolutional module and the data specifying the operator, e.g., a one-hot enco such that the data specifying the operator, e.g., a one-hot encoding of the operator, effectively selects the appropriate trainable transformation matrix that is applied by convolutional module.

Figure 2:
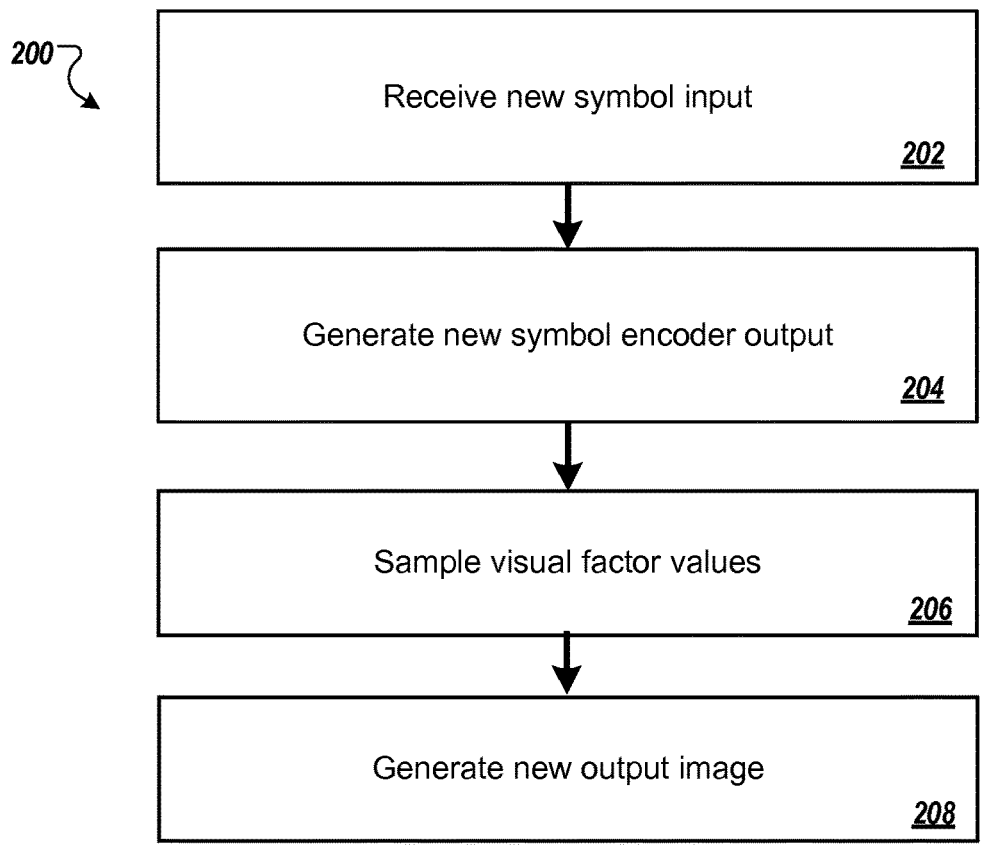
FIG. 2 is a flow diagram of an example process for generating a new image.

FIG. 2 is a flow diagram of an example process 200 for generating a new image. For convenience, the process 200 will be described as being performed by a system of one or more computers located in one or more locations. For example, a neural network system, e.g., the neural network system 100 of FIG. 1, appropriately programmed, can perform the process 200.

The system receives a new symbol input (step 202). The symbol input includes one or more symbols from a vocabulary of symbol inputs.

The system processes the new symbol input using the symbol encoder neural network to generate a new symbol encoder output for the new symbol input (step 204). As described above, the new symbol encoder output parametrizes a distribution over possible values for each of a plurality of visual factors of variation.

The system samples, from the distribution parameterized by the new symbol encoder output, a respective value for each of the plurality of visual factors (step 206).

The system processes a new image decoder input that includes the respective values for the visual factors using the image decoder neural network to generate the new output image (step 208). Because each symbol refers to a concept grounded in a set of relevant visual factors of variation, the output image depicts concepts referred to by the input symbols. In implementations this is facilitated by the way in which the symbol encoder neural network and the image decoder neural network have been trained, though the particular training technique described is not the only way to ensure that the concepts are grounded in visual primitives.

Figure 3:
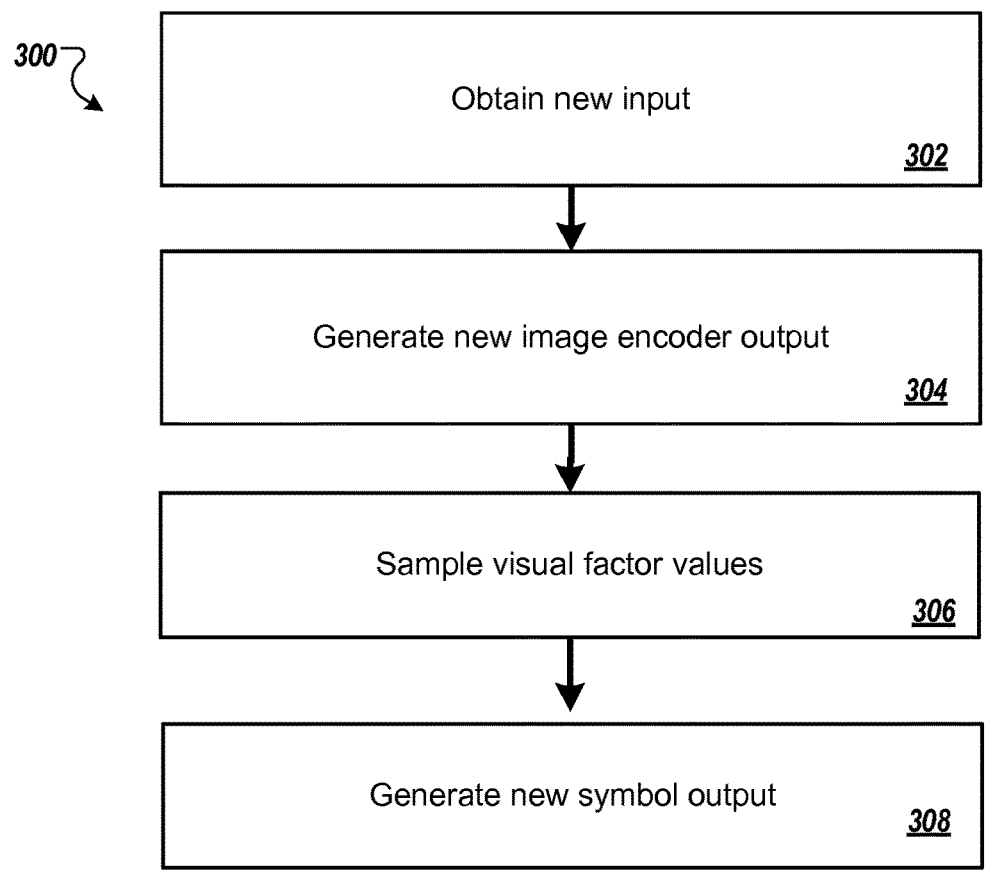
FIG. 3 is a flow diagram of an example process for generating a new symbol output.

FIG. 3 is a flow diagram of an example process 300 for generating a new symbol output. For convenience, the process 300 will be described as being performed by a system of one or more computers located in one or more locations. For example, a neural network system, e.g., the neural network system 100 of FIG. 1, appropriately programmed, can perform the process 300.

The system receives a new image (step 302).

The system processes the new image using the image encoder neural network to generate a new image encoder output for the new image (step 304). As described above, the new image encoder output parametrizes a distribution over possible values for each of a plurality of visual factors of variation.

The system samples, from the distribution parameterized by the new image encoder output, a respective value for each of the plurality of visual factors (step 306).

The system processes a new symbol decoder input that includes the respective values for the visual factors using the symbol decoder neural network to generate the new symbol output (step 308). Because each symbol refers to a concept grounded in a set of relevant visual factors of variation, facilitated by the way that the image encoder neural network and the symbol decoder neural network have been trained, the symbol output includes symbols that refer to concepts depicted in the new image.

Figure 4:
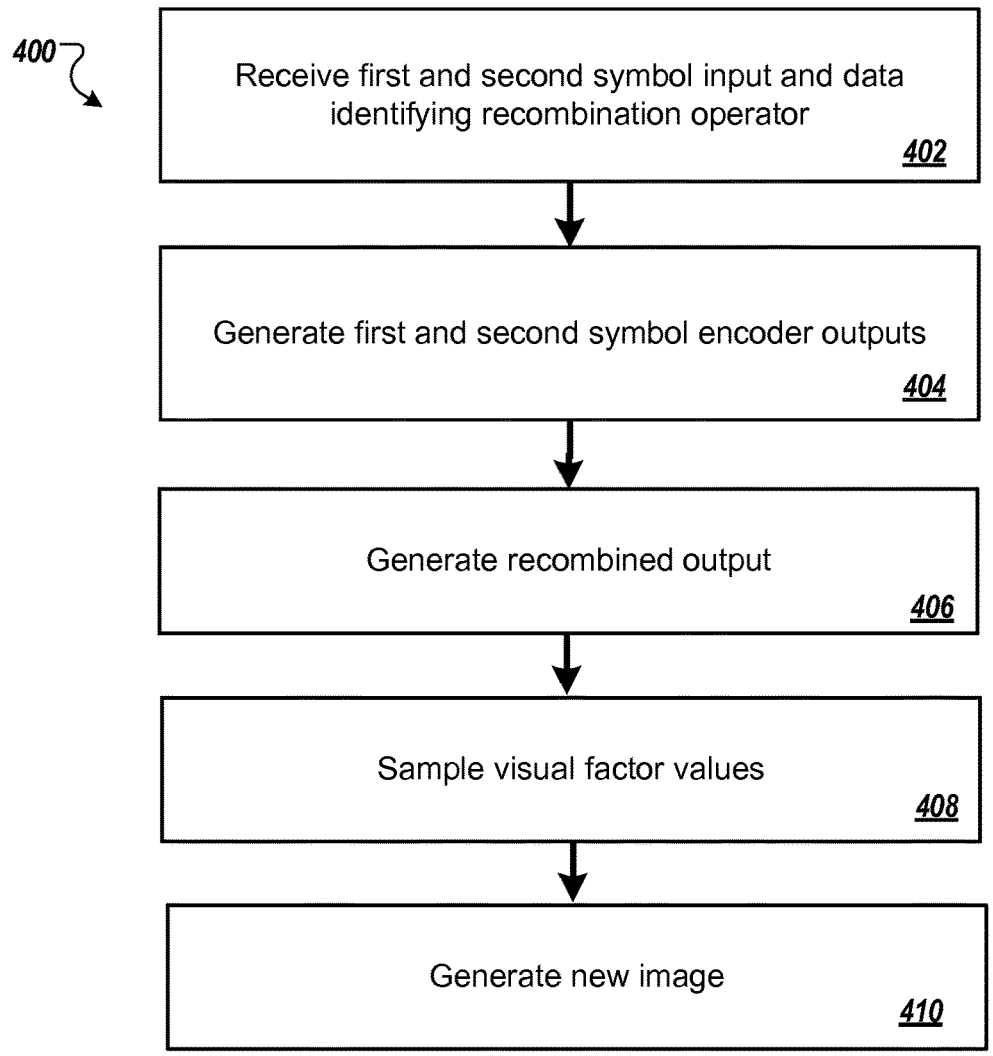
FIG. 4 is a flow diagram of an example process for generating a new image using recombined symbol inputs.

FIG. 4 is a flow diagram of an example process 400 for generating a new image from recombined symbol inputs. For convenience, the process 400 will be described as being performed by a system of one or more computers located in one or more locations. For example, a neural network system, e.g., the neural network system 100 of FIG. 1, appropriately programmed, can perform the process 400.

The system receives first and second symbol inputs and data specifying a recombination operator that should be applied to the first and second inputs (step 402). The recombination operator is one of a set of recombination operators that the recombination neural network is configured to accept as input.

The system processes each of the first and second symbol inputs using the symbol encoder neural network to generate a first symbol encoder output for the first symbol input and a second symbol encoder output for the second symbol input (step 404).

The system processes a recombination input that includes (i) the first symbol encoder output generated from a first symbol input, (ii) the second symbol encoder output generated from a second symbol input, and (iii) the data identifying the recombination operator to generate a recombined output that also parametrizes a distribution over possible values for each of the plurality of generative visual factors of variation (step 406). As described above, the operations performed on the first and second symbol encoder outputs by the recombination neural network will be different depending on which recombination operator is identified in the recombination input.

The system samples, from the distribution parameterized by the recombined output, a respective value for each of the plurality of visual factors (step 408).

The system processes a new image decoder input that includes the respective values for the visual factors using the image decoder neural network to generate a new image (step 410). Because the recombined output is grounded in a set of relevant visual factors of variation the new image depicts a recombination of the concepts that are referred to by the first and second symbol inputs. That is, even though the system is not explicitly provided with the effects of applying the recombination operator on the first and second symbol inputs, the system is nonetheless able to generate an accurate output image by making use of the symbol recombination neural network.

Training the recombination neural network will be described in more detail below with reference to FIG. 6.

Figure 5:
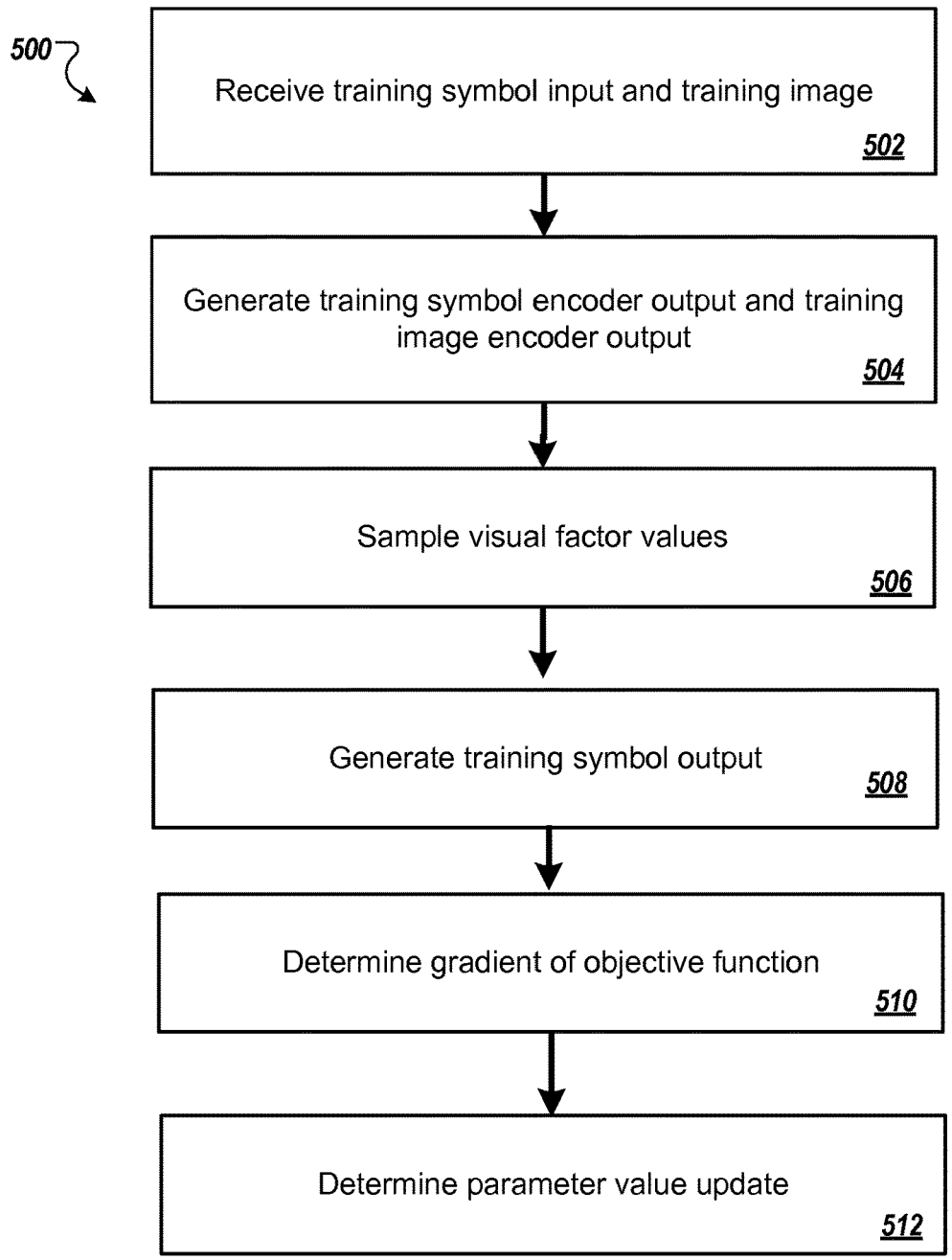
FIG. 5 is a flow diagram of an example process for training the symbol encoder and symbol decoder neural networks.

FIG. 5 is a flow diagram of an example process 500 for training the symbol encoder and symbol decoder neural networks. For convenience, the process 500 will be described as being performed by a system of one or more computers located in one or more locations. For example, a neural network system, e.g., the neural network system 100 of FIG. 1, appropriately programmed, can perform the process 500.

Generally, before performing the process 500, the system pre-trains the image encoder and image decoder neural networks on visual training data, i.e., on images, in an unsupervised manner.

In particular, the system pre-trains the two neural networks so that the image encoder neural network generates disentangled representations and the image decoder neural network generates accurate reconstructions of images based on the representations generated by the image encoder neural network.

In some implementations, the system jointly trains the image encoder neural network and the image decoder neural network using a β-VAE training technique. β-VAE is a modification of the variational autoencoder (VAE) framework that introduces an adjustable hyperparameter β to the original VAE objective. By appropriately setting the value of the hyperparameter, e.g., to a value greater than one, the representations generated by the encoder neural network become disentangled representations. β-VAE is described in more detail in Irina Higgins, Loic Matthey, Arka Pal, Christopher Burgess, Xavier Glorot, Matthew Botvinick, Shakir Mohamed, and Alexander Lerchner. β-VAE: Learning basic visual concepts with a constrained variational framework.

In some other implementations, the system jointly trains the image encoder neural network and the image decoder neural network using a β-VAE training technique that replaces a pixel level log-likelihood employed by the VAE objective with a loss in a high-level feature space of a denoising autoencoder (DAE). Such a technique is described in Irina Higgins, Arka Pal, Andrei Rusu, Loic Matthey, Christopher Burgess, Alexander Pritzel, Matthew Botvinick, Charles Blundell, and Alexander Lerchner. DARLA: Improving zero-shot transfer in reinforcement learning. Using this technique in place of β-VAE may, in some circumstances, improve the quality of the reconstructions generated by the trained image decoder neural network while still resulting in the trained encoder neural network generating disentangled representations.

Thus, this pre-training causes the image encoder neural network to learn how to generate encoder outputs that are disentangled representations that accurately reflect the visual building blocks of the images in the training data. However, before the symbol encoder and decoder neural networks are also trained, there is no association between these building blocks and any symbolic concepts.

Once the system has pre-trained the image encoder and image decoder neural networks, the system can repeatedly perform the process 500 on labeled training pairs that each include a training symbol input and a corresponding training image that matches the symbol input, i.e., that has been classified as depicting concepts that are referred to by the symbol input. This training generally causes the symbol encoder neural network to learn how to link symbol inputs to the corresponding visual building blocks that were learned by the image encoder neural network.

The system receives a training symbol input and a training image that matches the training symbol input (step 502).

The system processes the training image using the image encoder neural network in accordance with first values of the image encoder parameters to generate a training image encoder output for the training image (step 504). As described above, the first values are the values generated by pre-training the image encoder neural network.

The system processes the training symbol input using the symbol encoder neural network in accordance with current values of the symbol encoder parameters to determine a training symbol encoder output for the training symbol input (step 506).

The system samples, from the distribution parameterized by the training symbol encoder output, a respective value for each of the plurality of visual factors (step 508).

The system processes a training symbol decoder input that includes the respective values for the visual factors using the symbol decoder neural network in accordance with current values of the symbol decoder parameters to generate a training symbol output (step 510).

The system determines, i.e., using backpropagation, a gradient with respect to the symbol encoder parameters and the symbol decoder parameters of an objective function that includes (i) a variational auto encoder (VAE) objective and (ii) a term that encourages alignment between the training symbol encoder output and the training image encoder output (step 512).

In particular, by employing the VAE objective, the system trains the symbol encoder neural network and the symbol decoder neural network to generate accurate reconstructions of training symbol inputs using visual factor values that are sampled from the symbol encoder outputs generated by the symbol encoder neural network.

By employing the alignment term, the system trains the symbol encoder neural network generate symbol encoder outputs that match image encoder outputs and that can therefore be used by the image decoder neural network to generate accurate output images, i.e., to generate images that depict the concepts referred to by the corresponding symbol inputs.

In some implementations, the objective function is a loss to be minimized that satisfies:

$$\mathbb{E}_{q_{\phi_y}(z_y|y)}[\log p_{\phi_y}(y|z_y)] - \beta D_{KL}(q_{\phi_y}(z_y|y)\|p(z_y)) - \lambda D_{KL}(q_{\phi_x}(z_x|x)\|q_{\phi_y}(z_y|y)),$$

where $\mathbb{E}_{q_{\phi_y}(z_y|y)}[\log p_{\phi_y}(y|z_y)] - \beta D_{KL}(q_{\phi_y}(z_y|y)\|p(z_y))$ is the VAE objective, $\lambda D_{KL}(q_{\phi_x}(z_x|x)\|q_{\phi_y}(z_y|y))$ is the alignment term, y is a training symbol input, x is the corresponding training image, $\mathbb{E}$ is the expectation operator, $z_y$ is the space of the symbol encoder outputs, $z_x$ is the space of the image encoder outputs, $p(z_y)$ is a prior probability distribution over the space of the symbol encoder outputs (e.g., a multi-variate unit Gaussian distribution), $q_{\phi_y}$ is the symbol encoder neural network, $p_{\phi_y}$ is the symbol decoder neural network, $q_{\phi_x}$ is the image encoder neural network, $p_{\phi_y}(y|z_y)$ is the probability assigned to the training symbol input by the symbol decoder neural network given the visual factor values sampled from the symbol encoder output, $D_{KL}(q_{\phi_y}(z_y|y)\|p(z_y))$ is the KL divergence between the symbol encoder output and the prior distribution, and $D_{KL}(q_{\phi_x}(z_x|x)\|q_{\phi_y}(z_y|y))$ is the KL divergence between the image encoder output and the symbol encoder output, and $\lambda$ and $\beta$ are constants. In some cases, $\beta$ is set to a larger value than $\lambda$, e.g., five or ten times the value of $\lambda$, to ensure the effectiveness of the training process.

In particular, by minimizing the forward KL divergence $D_{KL}(q_{\phi_x}(z_x|x)\|q_{\phi_y}(z_y|y))$ rather than the mode picking reverse KL divergence $D_{KL}(q_{\phi_y}(z_y|y)\|q_{\phi_x}(z_x|x))$, the system ensures that symbol encoder outputs assign narrow distributions to relevant latent factors, i.e., those that are impacted by the symbols in the symbol input, while assigning wider distributions that are similar to the prior distribution to irrelevant latent factors, i.e., those that are not impacted by the symbols in the symbol input. This allows output images generated by the system after training to be variable in factors that are not impacted by the current symbol input while accurately depicting concepts that are referred to by the current symbol input. In other words, this allows the system to effectively generate images from symbol inputs that refer to concepts at varying levels of the concept hierarchy, i.e., by filling in missing attributes with plausible values based on samples drawn from the wider distributions.

The system determines an update to the current values of the symbol encoder parameters and the symbol decoder parameters using the gradients, e.g., by applying a learning rate to the determined gradients (step 514).

Once the system has performed the process 500 for each training pair, for example in a mini-batch of training pairs, the system applies the updates to the current values of the symbol encoder and symbol decoder parameters, e.g., in accordance with the update rule employed by the optimizer used by the system in the training, e.g., the Adam optimizer or another gradient descent-based optimizer.

The system repeats the process 500 for multiple mini-batches to repeatedly update the values of the symbol encoder parameters and the symbol decoder parameters.

As described above, once the system has trained the symbol encoder and decoder neural networks, the system can be augmented with a symbol recombination neural network. Training the symbol recombination neural network allows to generalize past the concepts referred to by symbols encountered during the training of the symbol encoder and decoder networks and to additionally generate accurate images of concepts that are recombinations of multiple inputs.

Figure 6:
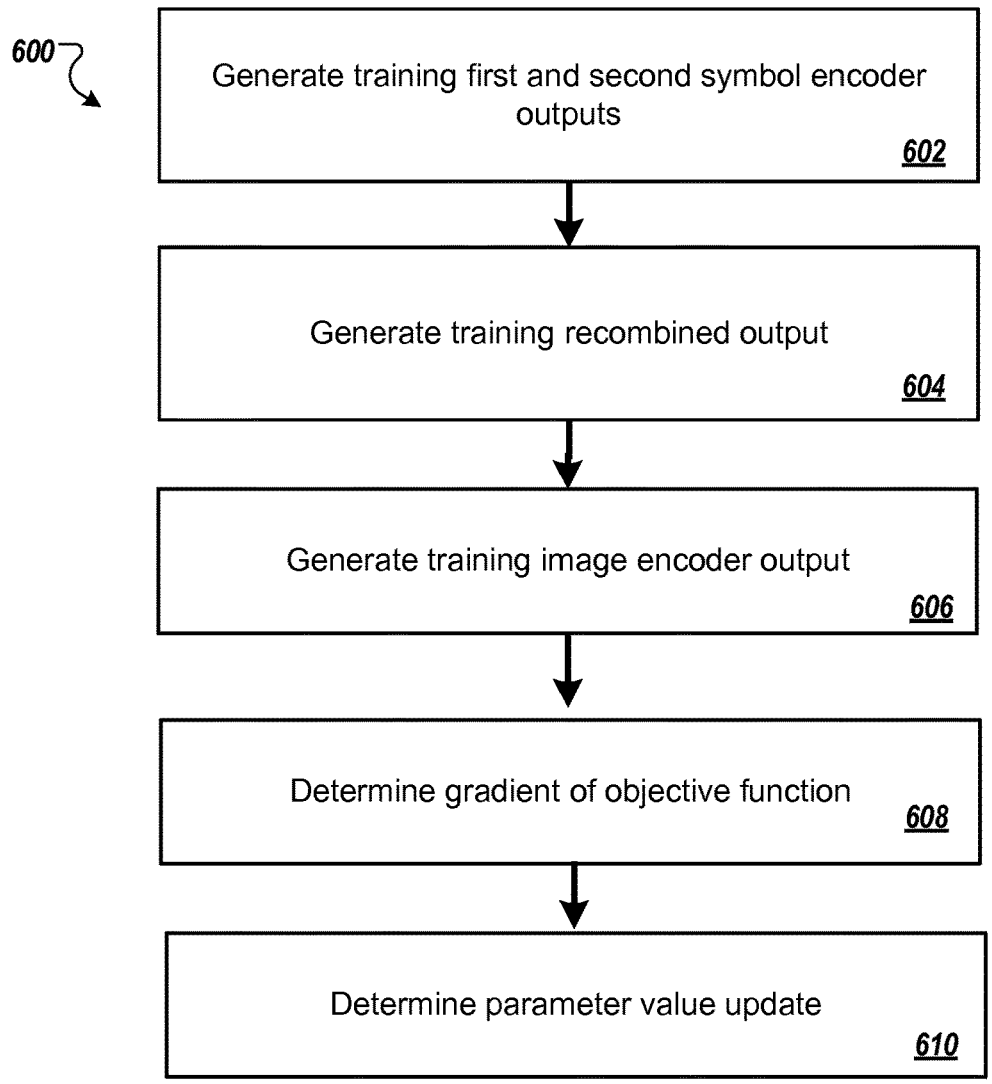
FIG. 6 is a flow diagram of an example process for training the symbol recombination neural network.

FIG. 6 is a flow diagram of an example process 600 for training the symbol recombination neural network. For convenience, the process 600 will be described as being performed by a system of one or more computers located in one or more locations. For example, a neural network system, e.g., the neural network system 100 of FIG. 1, appropriately programmed, can perform the process 600.

To train the symbol recombination neural network, the system receives additional training data that includes multiple training items that each include an additional training image, two symbol inputs, and data identifying a recombination operator that was applied to the symbol inputs such that the resulting recombined symbol input accurately describes the concepts depicted in the additional training image.

The system then performs the process 600 for each such training item to repeatedly update the values of the recombination parameters.

The system processes the training first symbol input and the training second symbol input in the training item using the (trained) symbol encoder neural network to generate a training first symbol encoder output and a training second symbol encoder output (step 602).

The system then processes a training recombined input that includes the training first symbol encoder output, the training second symbol encoder output, and data identifying the recombination operator applied to the first and second symbol inputs using the symbol recombination neural network in accordance with current values of the recombination parameters to generate a training recombined output (step 604).

The system processes the training image using the image encoder neural network to generate a training image encoder output (step 606).

The system determines, i.e., using backpropagation, a gradient of an objective function that depends on a divergence between the training image encoder output and the training recombined output (step 608). For example, the objective function can be the KL divergence between the training image encoder output and the training recombined output. By using this objective function, the system trains the recombination neural network to generate recombined outputs that can be used by the image decoder neural network to generate images that depict scenes that match the relevant factors depicted in the additional training image in the training item.

The system then determines an update to the current values of the recombination parameters using the gradient (step 610), e.g., by applying a learning rule to the gradient.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that when executed by the one or more computers cause the one or more computers to implement:
   an image decoder neural network having a plurality of image decoder parameters, wherein the image decoder neural network is configured to:
      receive an image decoder input comprising a respective value for each of a plurality of generative visual factors of variation; and
      process the image decoder input in accordance with the image decoder parameters to generate an output image defined by the values for the generative visual factors of variation in the image decoder input;
   a symbol encoder neural network having a plurality of symbol encoder parameters, wherein the symbol encoder neural network is configured to:
      receive a symbol input comprising one or more symbols from a vocabulary of symbols; and
      process the symbol input in accordance with the symbol encoder parameters to generate a symbol encoder output that parameterizes a distribution over possible values for each of the plurality of generative visual factors of variation;
   a symbol recombination neural network having a plurality of recombination parameters, the symbol recombination neural network configured to:
      receive a recombination input comprising (i) a first symbol encoder output generated from a first symbol input, (ii) a second symbol encoder output generated from a second symbol input, and (iii) data identifying a recombination operator to be applied to the first symbol input and the second symbol input; and
      process the recombination input in accordance with the recombination parameters to generate a recombined output that parametrizes a recombined distribution over possible values for each of the plurality of generative visual factors of variation;
   a subsystem configured to:
      process the first symbol input using the symbol encoder neural network to generate the first symbol encoder output;
      process the second symbol input using the symbol encoder neural network to generate the second symbol encoder output;
      process the recombined input using the symbol recombination neural network to generate the recombined output; and
      generate a first output image that depicts concepts referred to by a recombined symbol resulting from applying the recombination operator to the first symbol input and the second symbol input, by:
         sampling, from the recombined distribution parameterized by the recombined output, a respective value for each of the plurality of generative visual factors of variation; and
         processing a first image decoder input comprising the respective values for the generative visual factors of variation using the image decoder neural network to generate the first output image.

2. The system of claim 1, wherein the instructions further cause the one or more computers to implement:
   an image encoder neural network having a plurality of image encoder parameters, wherein the image encoder neural network is configured to:
      receive an input image; and
      process the input image in accordance with the image encoder parameters to generate an image encoder output that parameterizes a distribution over possible values for each of a plurality of generative visual factors of variation; and
   a symbol decoder neural network having a plurality of symbol decoder parameters, wherein the symbol decoder neural network is configured to:
      receive a symbol decoder input comprising a respective value for each of the plurality of generative visual factors; and
      process the symbol decoder input in accordance with the symbol decoder parameters to generate a symbol output that includes one or more symbols from the vocabulary of symbols, and wherein the subsystem is further configured to:
   receive a new input image; and generate a new symbol output that includes one or more symbols that refer to concepts depicted in the new input image, comprising:
processing the new input image using the image encoder neural network to generate a new image encoder output for the new input image;
sampling, from the distribution parameterized by the new image encoder output, a respective value for each of the plurality of generative visual factors of variation; and
processing a new symbol decoder input comprising the respective values for the generative visual factors of variation using the symbol decoder neural network to generate the new symbol output.

3. The system of claim 1, wherein the recombination neural network includes at least one layer that applies a recombination dependent transformation to an activation of the layer.

4. The system of claim 3, wherein the recombination dependent transformation is a recombination dependent bias.

5. The system of claim 1, wherein the recombination neural network is a conditional convolutional module that is conditioned on the operator.

6. The system of claim 5, wherein the convolutional module is conditioned on the operator using a tensor product operation.

7. The system of claim 2, wherein the symbol encoder neural network and the symbol decoder neural networks comprise feedforward neural networks.

8. The system of claim 2, wherein the symbol encoder neural network and the symbol decoder neural networks comprise recurrent neural networks.

9. The system of claim 2, wherein the image encoder neural network has been trained to generate disentangled representations of the plurality of generative factors of variation.

10. The system of claim 1, wherein the subsystem is further configured to:
receive a new symbol input comprising one or more symbols from the vocabulary; and
generate a new output image that depicts concepts referred to by the new symbol input, comprising:
processing the new symbol input using the symbol encoder neural network to generate a new symbol encoder output for the new symbol input;
sampling, from the distribution parameterized by the new symbol encoder output, a respective value for each of the plurality of generative visual factors of variation; and
processing a new image decoder input comprising the respective values for the generative visual factors of variation using the image decoder neural network to generate the new output image.

11. One or more non-transitory computer-readable storage media storing instructions that when executed by one or more computers cause the one or more computers to implement:
an image decoder neural network having a plurality of image decoder parameters, wherein the image decoder neural network is configured to:
receive an image decoder input comprising a respective value for each of a plurality of generative visual factors of variation; and
process the image decoder input in accordance with the image decoder parameters to generate an output image defined by the values for the generative visual factors of variation in the image decoder input;
a symbol encoder neural network having a plurality of symbol encoder parameters, wherein the symbol encoder neural network is configured to:
receive a symbol input comprising one or more symbols from a vocabulary of symbols; and
process the symbol input in accordance with the symbol encoder parameters to generate a symbol encoder output that parameterizes a distribution over possible values for each of the plurality of generative visual factors of variation;
a symbol recombination neural network having a plurality of recombination parameters, the symbol recombination neural network configured to:
receive a recombination input comprising (i) a first symbol encoder output generated from a first symbol input, (ii) a second symbol encoder output generated from a second symbol input, and (iii) data identifying a recombination operator to be applied to the first symbol input and the second symbol input; and
process the recombination input in accordance with the recombination parameters to generate a recombined output that parametrizes a recombined distribution over possible values for each of the plurality of generative visual factors of variation;
and
a subsystem configured to:
process the first symbol input using the symbol encoder neural network to generate the first symbol encoder output;
process the second symbol input using the symbol encoder neural network to generate the second symbol encoder output;
process the recombination input using the symbol recombination neural network to generate the recombined output; and
generate a first output image that depicts concepts referred to by a recombined symbol resulting from applying the recombination operator to the first symbol input and the second symbol input, by:
sampling, from the recombined distribution parameterized by the recombined output, a respective value for each of the plurality of generative visual factors of variation; and
processing a first image decoder input comprising the respective values for the generative visual factors of variation using the image decoder neural network to generate the first output image.

12. A method performed by one or more computers, the method comprising:
receiving a first symbol input comprising one or more symbols from a vocabulary of symbols;
receiving a second symbol input comprising one or more symbols from the vocabulary of symbols;
receiving data specifying a recombination operator to be applied to the first symbol input and the second symbol input;
processing the first symbol input using a symbol encoder neural network having symbol encoder parameters, wherein the symbol encoder neural network is configured to process the first symbol input in accordance with the symbol encoder parameters to generate a first symbol encoder output that parameterizes a first distribution over possible values for each of a plurality of generative visual factors of variation;

processing the second symbol input using the symbol encoder neural network, wherein the symbol encoder neural network is configured process the second symbol input in accordance with the symbol encoder parameters to generate a second symbol encoder output that parameterizes a second distribution over possible values for each of the plurality of generative visual factors of variation;

processing a recombination input comprising (i) the first symbol encoder output, (ii) the second symbol encoder output, and (iii) data identifying the recombination operator to be applied to the first symbol input and the second symbol input using a symbol recombination neural network having recombination parameters, wherein the symbol recombination neural network is configured to process the recombination input in accordance with the recombination parameters to generate a recombined output that parametrizes a recombined distribution over possible values for each of the plurality of generative visual factors of variation; and generating a first output image that depicts concepts referred to by a recombined symbol resulting from applying the recombination operator to the first symbol input and the second symbol input, by:

sampling, from the recombined distribution parameterized by the recombined output, a respective value for each of the plurality of generative visual factors of variation; and processing a first image decoder input comprising the respective values for the generative visual factors of variation using an image decoder neural network having a plurality of image decoder parameters, wherein the image decoder neural network is configured to receive the first image decoder input and process the first image decoder input in accordance with the image decoder parameters to generate the first output image.

13. The method of claim 12, further comprising:

receiving a new input image; and generating a new symbol output that includes one or more symbols that refer to concepts depicted in the new input image, comprising:

processing the new input image using an image encoder neural network having a plurality of image encoder parameters, wherein the image encoder neural network is configured to process the new input image in accordance with the image encoder parameters to generate a new image encoder output that parameterizes a distribution over possible values for each of the plurality of generative visual factors of variation;

sampling, from the distribution parameterized by the new image encoder output, a respective value for each of the plurality of generative visual factors of variation; and processing a new symbol decoder input comprising the respective values for the generative visual factors of variation using a symbol decoder neural network having a plurality of symbol decoder parameters, wherein the symbol decoder neural network is configured to process the new symbol decoder input in accordance with the symbol decoder parameters to generate the new symbol output.

14. The method of claim 12, wherein the recombination neural network includes at least one layer that applies a recombination dependent transformation to an activation of the layer.

15. The method of claim 14, wherein the recombination dependent transformation is a recombination dependent bias.

16. The method of claim 12, wherein the recombination neural network is a conditional convolutional module that is conditioned on the operator.

17. The method of claim 16, wherein the convolutional module is conditioned on the operator using a tensor product operation.

18. The method of claim 13, wherein the symbol encoder neural network and the symbol decoder neural networks comprise feedforward neural networks.

19. The method of claim 13, wherein the symbol encoder neural network and the symbol decoder neural networks comprise recurrent neural networks.

20. The method of claim 12, further comprising:

receiving a new symbol input comprising one or more symbols from the vocabulary; and generating a new output image that depicts concepts referred to by the new symbol input, comprising:

processing the new symbol input using the symbol encoder neural network to generate a new symbol encoder output for the new symbol input;

sampling, from the distribution parameterized by the new symbol encoder output, a respective value for each of the plurality of generative visual factors of variation; and processing a new image decoder input comprising the respective values for the generative visual factors of variation using the image decoder neural network to generate the new output image.

* * * * *